(12) United States Patent
Schlesinger et al.

(10) Patent No.: US 12,008,644 B2
(45) Date of Patent: *Jun. 11, 2024

(54) GUIDANCE ENGINE: AN AUTOMATED SYSTEM AND METHOD FOR PROVIDING FINANCIAL GUIDANCE

(71) Applicant: Capital One Services, LLC, McLean, VA (US)

(72) Inventors: Katharine Schlesinger, Seattle, WA (US); John Rush, Seattle, WA (US); Zheyu Yang, Seattle, WA (US); Matthew Davis, Seattle, WA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,023

(22) Filed: Apr. 20, 2023

(65) Prior Publication Data

US 2023/0252559 A1 Aug. 10, 2023

Related U.S. Application Data

(63) Continuation of application No. 17/322,968, filed on May 18, 2021, now Pat. No. 11,669,897, which is a
(Continued)

(51) Int. Cl.
*G06Q 40/00* (2023.01)
*G06F 16/25* (2019.01)
(Continued)

(52) U.S. Cl.
CPC ........... *G06Q 40/03* (2023.01); *G06F 16/258* (2019.01); *G06N 5/01* (2023.01)

(58) Field of Classification Search
CPC .... G06Q 40/00; G06Q 40/025; G06F 16/258; G06N 5/003
See application file for complete search history.

(56) References Cited

U.S. PATENT DOCUMENTS 11,017,474 B1 * 5/2021 Guerrero ............. G06F 3/04817
11,127,075 B1 * 9/2021 Mahoney ............... G06Q 40/12
(Continued)

FOREIGN PATENT DOCUMENTS

KR 2017065913 A * 6/2017 ......... G06Q 30/0279
KR 20170065913 A 6/2017

OTHER PUBLICATIONS

Application of Fuzzy Logic in Financial Markets for Decision Making, T Venkat Narayana Rao; Reddy, Kushal. International Journal of Advanced Research in Computer Science; Udaipur vol. 8, Iss. 3, (Mar. 2017) (Year: 2017).*
(Continued)

*Primary Examiner* — Lalita M Hamilton
(74) *Attorney, Agent, or Firm* — Banner & Witcoff, Ltd.

(57) ABSTRACT

Aspects described herein may allow for receiving, by a detection server, a plurality of configuration parameters, wherein each configuration parameter includes a type of a risk and an associated level of the risk, with a corresponding automated remediation action for each configuration parameter. A remediation management framework authenticates the detection server for access to the remediation management framework and initiates a scanning of a system of interest, based on the plurality of configuration parameters, by the detection server, to identify one or more risk findings. The remediation management framework receives the identified one more risk findings; and matches each of the one or more risk findings with the plurality of configuration parameters, which then triggers by the remediation management framework, the corresponding automated remediation action associated with each of the one or more risk findings.

20 Claims, 4 Drawing Sheets

Related U.S. Application Data continuation of application No. 16/680,793, filed on Nov. 12, 2019, now Pat. No. 11,023,967.

(51) Int. Cl.
*G06N 5/01* (2023.01)
*G06Q 40/03* (2023.01)

(56) References Cited

U.S. PATENT DOCUMENTS

| | | |
|---|---|---|
| 2009/0048957 A1 | 2/2009 | Celano |
| 2010/0198750 A1 | 8/2010 | Ron et al. |
| 2010/0280935 A1 | 11/2010 | Fellowes et al. |
| 2014/0074688 A1 | 3/2014 | Shvarts et al. |
| 2016/0034932 A1 | 2/2016 | Sion et al. |
| 2019/0019246 A1* | 1/2019 | Bowman ............ G06Q 40/00 |
| 2019/0147529 A1 | 5/2019 | Wright et al. |
| 2019/0378207 A1* | 12/2019 | Dibner-Dunlap ..... H04L 67/535 |
| 2020/0134717 A1 | 4/2020 | Hunsaker et al. |

OTHER PUBLICATIONS

T Venkat Narayana Rao et al. "Application of Fuzzy Logic in Financial Markets for Decision Making" International Journal of Advanced Research in Computer Science; Udaipur vol. 8, Issue 3. (Mar. 2017) all pages.
Jan. 26, 2021—U.S. Notice of Allowance—U.S. Appl. No. 16/680,793.
May 29, 2020—U.S. Office Action—U.S. Appl. No. 16/680,793.

* cited by examiner

GUIDANCE ENGINE: AN AUTOMATED SYSTEM AND METHOD FOR PROVIDING FINANCIAL GUIDANCE

CROSS-REFERENCE TO RELATED APPLICATIONS

The present application is a continuation of and claims priority to co-pending U.S. patent application Ser. No. 17/322,968 filed on May 18, 2021, entitled "Guidance Engine: An Automated System and Method for Providing Financial Guidance," which is a continuation of and claims priority to U.S. patent application Ser. No. 16/680,793 filed on Nov. 12, 2019 entitled "Guidance Engine: An Automated System and Method for Providing Financial Guidance" and issued as U.S. Pat. No. 11,023,967 on Jun. 1, 2021, the disclosure of which is hereby incorporated by reference in its entirety.

FIELD OF USE

Aspects of the disclosure provide for systems and methods to the field of automated risk assessment guidance software. More particularly, aspects of the disclosure are directed to automated financial analysis software systems.

BACKGROUND

The majority of Americans are burdened with high-interest rate debt and have less than $1,000 is savings. Approximately 69% of Americans have less than $1,000 in savings and 34% have no savings at all. The average household in the United States owes $6,829, based on 2016 data, in revolving credit card debt and pays an average of $1,141 in annual interest on that credit card debt. And, 78% of American are somewhat or extremely concerned about not having enough money for retirement.

Some of the above individuals have debt levels under 3,500 per person and under the proper identification and guidance could remove the majority of their debt in under six months. For those financially vulnerable individuals that have less than one month of savings for their committed monthly expenditures, they could save one month of committed monthly expenditure if they were to save 10% of their discretionary income per month for one year. However, while some of these individuals can improve their own financial health, many individuals do not have the knowledge or expertise to know what to do and how to do it.

BRIEF SUMMARY

Given the foregoing, many of the above identified individuals would benefit from unbiased, personalized, financial advice, but either can't afford or don't trust traditional financial advisors. While there are numerous on-line financial resources, there is no easy or accurate way to ascertain what is a correct approach for each individual. Therefore, what is needed is a system and method for digital guidance and advice based on a Guidance Engine that provides individuals with both holistic financial guidance and the resources to stay on track as they improve their financial health. Such an approach is based on a backend server system that analyzes a user's financial accounts and provides concrete, personalized steps to becoming more financially healthy based on a framework and methodology outlined below.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-based automated system for providing financial guidance. According to at least one aspect, a computer based automated system for providing financial guidance includes a guidance engine application program interface configured for end-user access in which a guidance engine includes an input system and a decision tree system. The input system is designed to receive input data based on a user's financial status and may include an initial calculation to optimize and integrate the input data based on at least an availability of data and generate an output set comprising estimated committed monthly expenses, income, emergency fund level and a high interest debt level of the user. The decision tree system is designed to accept the output set and an associated confidence score for each component of the output set, where the decision tree system may perform an intermediate calculation based on the user's emergency fund level and high interest debt level, and then ranks the user based on the initial calculation and the intermediate calculation using a financial best practices standard to determine a suggested next financial action step.

In another embodiment, a computer-implemented method for providing financial guidance includes gathering input data on a user including data corresponding to a user's monthly expenses, income, emergency fund level, and high interest debt level. The method may then perform an initial calculation on the input data to estimate committed monthly expenses of the user and an estimated monthly income of the user, wherein committed monthly expenses are defined as a total monthly fixed expense incurred by the user to cover essential needs and the estimated monthly income includes a gross, a net and a discretionary income. The method continues by performing an intermediate calculation to generate an estimated emergency fund level of the user and an estimated high interest debt level of the user, wherein the estimated emergency fund level is based on an amount of liquid assets available to cover the user's estimated committed monthly expenses, and wherein the estimated high interest debt level may include a loan with an interest rate above a pre-set threshold. The method then generates, based on the input data, a confidence score comprising a variability score and a reasonableness score for each of the user's estimated committed monthly expenses, estimated monthly income, estimated emergency fund level, and estimated high interest debt level. The method then categorizes the financial situation of the user, based on the user's estimated emergency fund level and estimated high interest debt level, using a financial best practices standard to determine a suggested next financial action step.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media findings remediation management framework system. For example, a software system of interest may contain one or more compliance issues, or an area of software that is not in compliance in terms of system security or functionality, which once detected, needs to be remediated. Such remediation can take many forms such as an email notification, shutting down a server, or further data analysis.

Before discussing these concepts in greater detail, however, several examples of a computing device that may be used in implementing and/or otherwise providing various aspects of the disclosure will first be discussed with respect to FIG. 1.

Figure 1:
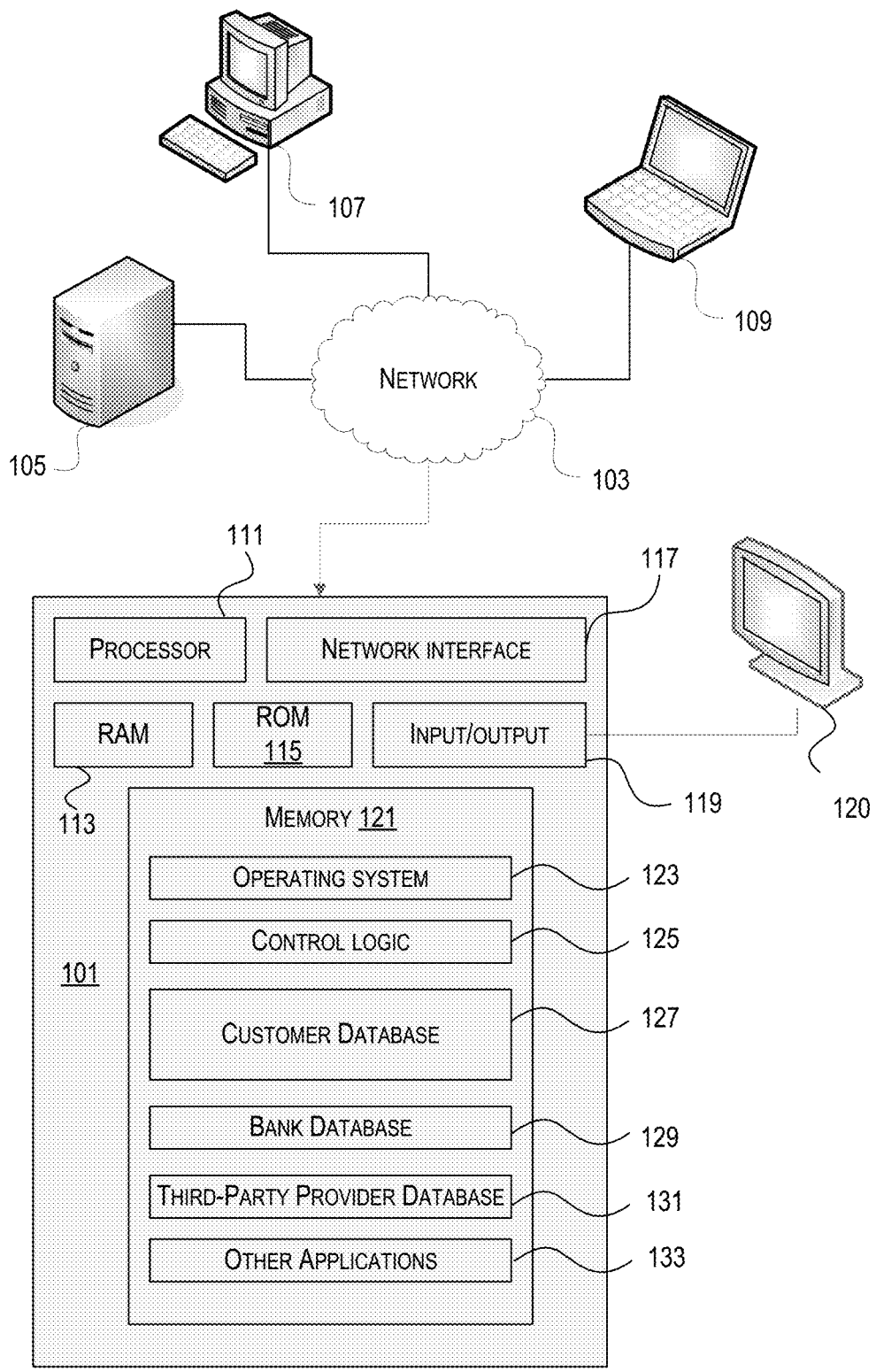
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database queries, interactions with client applications, scheduling and tracking of scan requests associated with a system of interest, generating remediation actions associated with a completed scan, logging scan results, logging remediation actions and risk levels in a database, and other functions. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use, for example, customer database 127, bank database 129, third-party provider database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., authentication information, risk management information, and remediation information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or customer database 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for a guidance engine framework and methodology.

In an embodiment, the guidance engine framework consists of multiple components working together to translate a customer's data into concrete financial advice. An "inputs" component optimizes a customer's data and may perform a series of calculations related to Emergency Funds (EF) and High Interest Debt (HID). A "decision tree" component uses the calculated values from the inputs component to identify the appropriate financial recommendation for the customer. The decision tree component follows a financial playbook referred to as the "Financial Best Practices" (FBP) Standard, which will be discussed in further detail.

To determine a customer's accurate financial guidance, that customer's finances need to be reviewed. At the most basic level, such a review may include identifying the customer's spending patterns, liquid assets and high interest debt levels. To understand customer spending, transactional data can be mined from a financial institution, in addition to data from credit bureaus, e.g., Equifax, Experian, and TransUnion. The guidance engine may also utilize cost-of-living (COL) data from publicly available sources, such as the Massachusetts Institute of Technology Living Wage Project and the American Community Survey (ACS). In addition to providing a benchmark value for the different categories, this external data may provide some rough estimates for customer spending based on their geographic location. Thus, even when a customer does not utilize a financial institution's account, a rough estimate of their categorized spending can still be determined.

As part of an analysis of the customer's financial picture, each customer's liquid assets may also be analyzed. Liquid assets are defined as money a customer has available to spend in case of an emergency. Liquid assets, for this application, may include the sum total of a customer's savings, checking, and money market balances and any other sources of readily accessible monies. If a financial institution cannot determine a customer's liquid assets, then a third-party provider, e.g., IXI data, may be used to provide a rough estimate of the customer's assets, savings, and investments, as benchmark values, and as a proxy when customer data is unavailable. Similar to the use of COL data described above, third-party provider data may provide estimates of a customer's net worth and assets based on their geographic location. Customers also have an opportunity to inform their financial institution about assets external to their financial institution and whether or not funds are earmarked for emergencies.

To estimate the amount of High Interest Debt each customer is carrying, such data may be extracted from a financial institution. This may involve looking at both a customer's card accounts and using credit report information to identify debt external to a financial institution.

Figure 2:
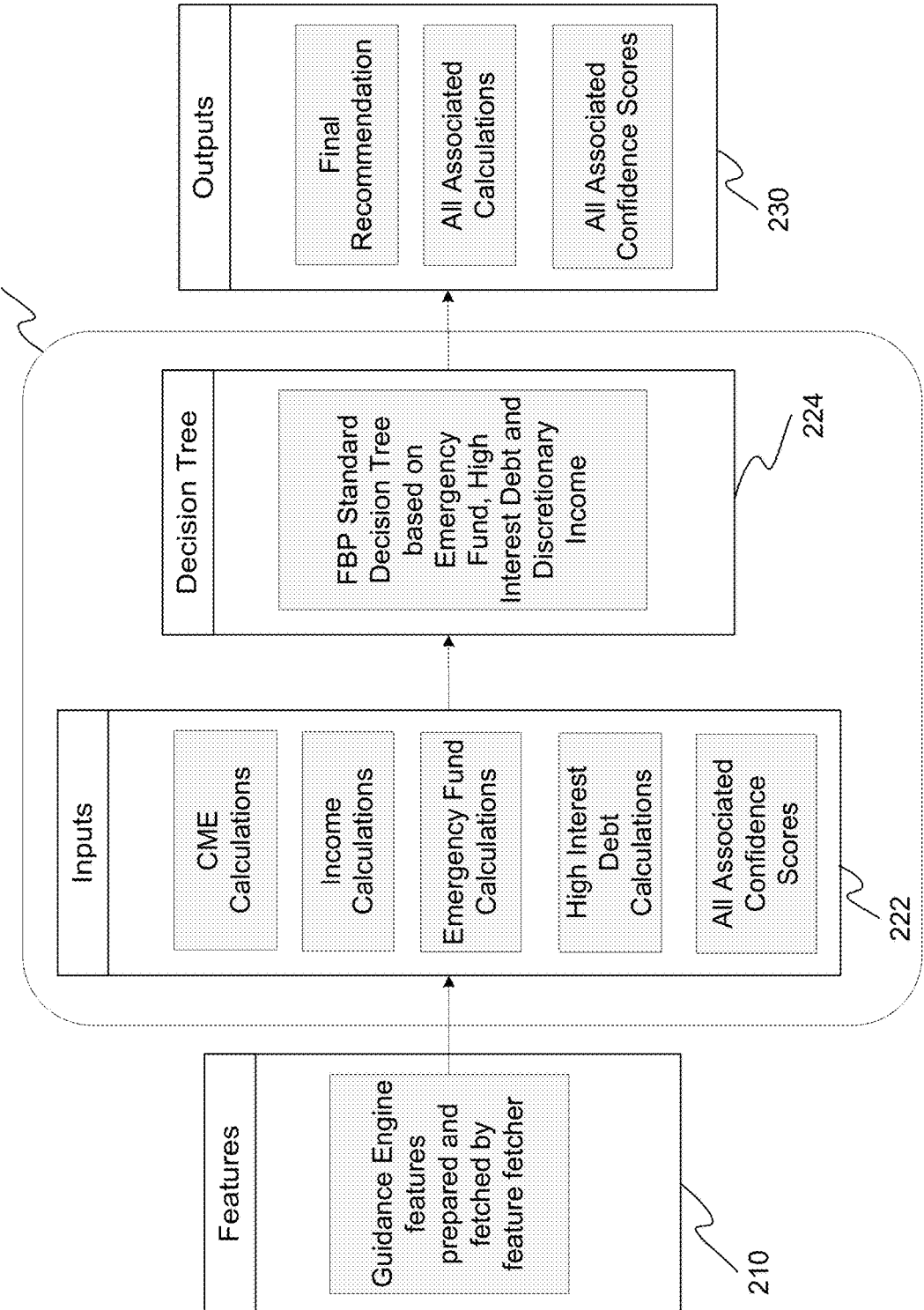
FIG. 2 depicts an overview block diagram of a guidance engine with its three main components in accordance with one or more illustrative aspects discussed herein.

FIG. 2 depicts an overview block diagram of a guidance engine system 200 with its three main components in accordance with one or more illustrative aspects discussed herein. Guidance engine system 200 includes features system 210, guidance engine 220, and outputs system 230. Further, guidance engine 220 includes an inputs section 222 and a decision tree system 224.

In an embodiment, inputs section 222 accepts internal and external data from a financial institution's internal data systems or external third-party systems to analyze a user's finances. Inputs section 222 includes two sets of calculations including an "initial" and "intermediate" calculations as will be discussed in further detail. Further, each subcomponent of code within inputs section 222 may be maintained as its own individual script that can utilize common functions that allows for modification at the subcomponent level.

For each user, or "customer," of a financial institution, guidance engine 220 accepts multiple data points, in some embodiments there are over 80 different data points, that can include data from within a financial institution, e.g., when a customer tells the financial institution specific financial values such as their amount of committed monthly expenses ("CME"). Committed monthly expenses is defined as the amount of fixed costs a customer must pay at a minimum each month. Guidance engine 220 then utilizes this data, where for the initial calculations, the guidance engine may optimize and integrate the data used for a given customer based on availability, ensuring that the guidance engine utilizes the best data available for each customer.

For the intermediate calculation, guidance engine 220 may perform a series of calculations related to emergency funds and high interest debt to determine values such as discretionary income and the time needed to pay down a customer's debt. The output, or values determined by inputs section 222, are then used by decision tree system 224 where decision tree system 224 places each customer in an FBP standard where the FBP standard defines where a customer stands financially and indicates which aspect of their personal finances should be addressed. The FBP standard illustrates a progressive customer flow, taking the customer through steps of building an emergency fund and paying down debt until they are financially stable enough to invest. Table 1 below illustrates a summary of a possible guidance engine FBP standard.

TABLE 1

| | FBP Standard | | |
|---|---|---|---|
| Emergency | | High Interest Debt Load | |
| Fund | None | Moderate | High |
| <1 CME | Customer must save a baseline level of 1 CME in liquid assets before considering other financial goals. | | |
| <3 CME | Customer should save 3 CME. | Customer should allocate funds to either Emergency Fund, Debt Paydown, or both. | |
| <6 CME | Customer should save 6 CME. | Customer should pay down debt with recurring payments. They are also eligible to save for Emergency Fund. | Customer should pay down debt with lump and/or recurring payments. They are also eligible to save for Emergency Fund. |
| >6 CME | Customer is ready to Invest. | Customer should pay down debt with recurring payments | Customer should pay down debt with lump and/or recurring payments |

Guidance engine 220, for each customer, may return multiple data values, including optimized data values, calculated values, recommended financial advice, data sourcing flags, and a series of metric quantifying a confidence level in each output.

Figure 3:
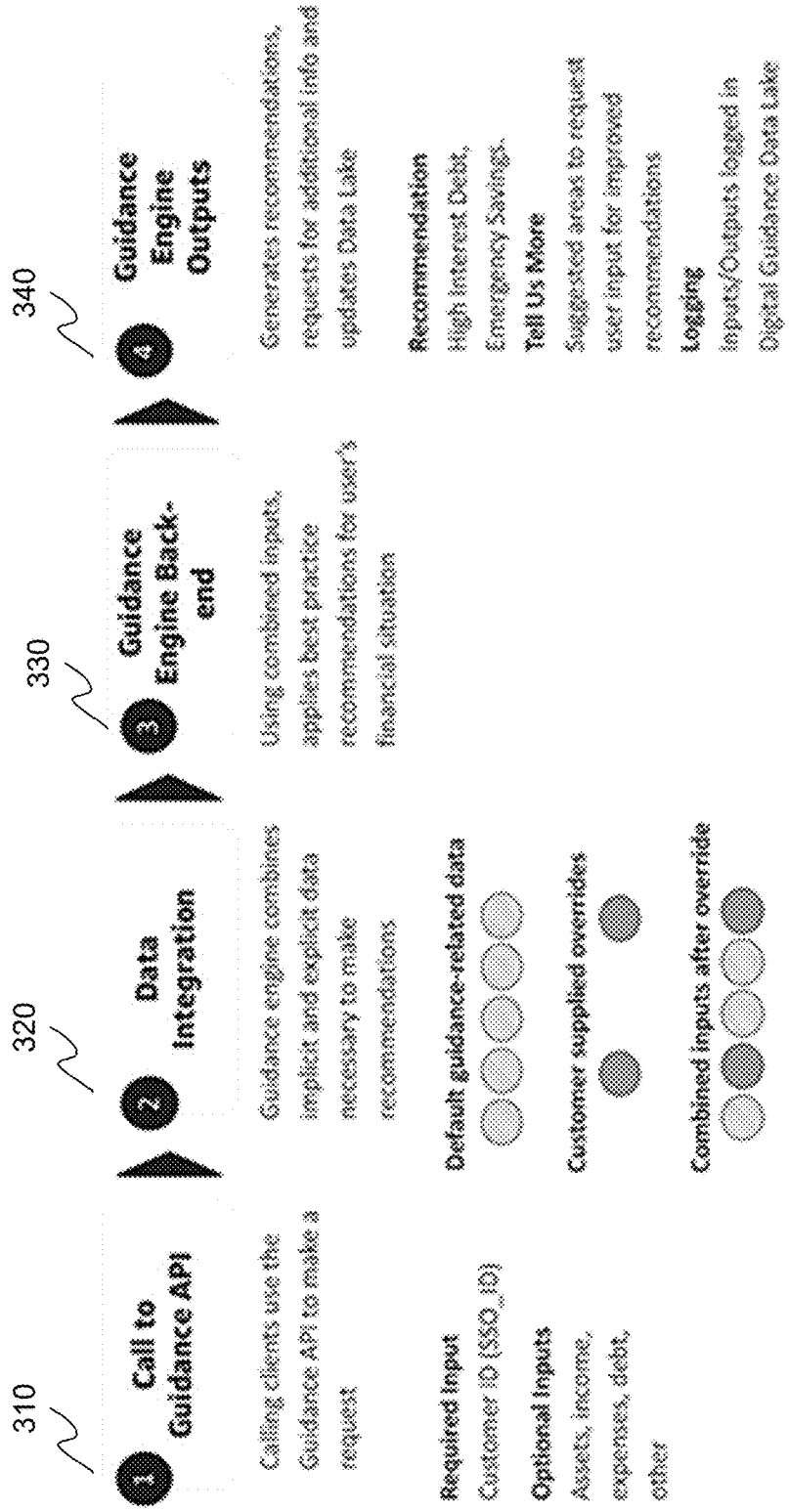
FIG. 3 depicts an overview flow diagram of the structure of the guidance engine application program interface with one or more illustrative aspects discussed herein.

FIG. 3 depicts an overview flow diagram of the structure of the guidance engine application program interface 300 in accordance with one or more illustrative aspects discussed herein. Guidance engine application program interface 300 includes four distinct structural components that includes a call to guidance application program interface 310, a data integration system 320, a guidance engine back-end 330 and guidance engine outputs 340.

Guidance application program interface 310 may be used by customers and clients to access and make requests of the guidance engine. Inputs to guidance application program interface 310 may include a customer identification and other inputs such as asset values, income levels, expenses, debt and any other financial data. Data integration system 320 accepts the inputs from guidance application program interface 310 and then combines implicit and explicit data, where the implicit data can include default guidance-related data and explicit data can include any customer supplied information. Guidance engine back-end 330 uses the combined data from data integration system 320 using best practice recommendations for a user's financial situation. Guidance engine outputs 340 generates recommendations and requests for additional information. Recommendations can include information relating to high interest debt and emergency savings. Requests for additional information can include suggested areas to request user input for improved recommendations and can also include logging of any inputs and outputs.

Guidance Engine—Inputs

The Guidance Engine may use both internal and external data sources to examine a customer's finances and provide a recommendation. When a user calls guidance application program interface 310 using an application program interface (API), a customer's data is pulled from a customer database, for example, customer database 127. This data can be automatically refreshed on a periodic basis.

As mentioned above, inputs sections 222 may accept both internal data from a financial institution and external data, such as from a third-party provider. Internal data sources may be broken down into multiple categories. For example, internal data can include financial institution data, i.e., bank data and card data, and external data, i.e., bureau data and other third-party data.

Bank Data may include transaction level data as well as checking and savings balances. Card Data may include transaction level data, credit card balances, annual percentage rate (APR), minimum payments, days in billing cycle etc. Bureau Data is extracted data on a customer's external data from credit bureau, for example the three Credit Bureaus: Equifax, Experian and TransUnion. This may include total revolving balances and monthly payments on auto loans, mortgages, external credit cards, and student loans. Note that this data can be updated on a periodic basis for institutional customers and third party data can be used to provide a rough estimate of the customer's assets, savings, investments, etc.

The External Data Sources used by the Guidance Engine may include at least the following resources: COL estimates from external data source such as the MIT Living Wage Estimates that may include the MIT Living Wage Calculator that combines numerous data sources to estimate the cost of living across the U.S. for different types of households. Using a web scraper, data, organized by County may then be associated with each customer with the appropriate County, via a 5-digit zip code. Thus, even if a financial institution is not a customer's primary financial institution, a broad estimate of the customer's expenses, based on their residence, can be estimated. Further, the MIT Living Wage Calculator lists the Annual Expenses for a range of different household types, including food, childcare, medical, housing, transportation, annual taxes, etc. And, the Living Wage Calculator may also provide details about minimum income required to cover these expenses for different households.

External data can also include American Community Survey (ACS) Data, that is in contrast to the Census, which focuses on accurate population numbers, the ACS contains information about a population's characteristics, such as their job, education, home-ownership, etc. ACS data provides higher geographic resolution across the entire country, in contrast to the MIT Living Wage data that is based on counties. In contrast, the ACS may use the customer zip codes to associate each individual with their associated Block Group, which has a population ranging between 600 and 3000 people. Data points can be obtained from ACS and include rent payments, mortgage payments, and per capita gross income.

External data can also include user augmented data that is provided by a customer. The fundamental issue faced by the guidance engine is data sufficiency. There can be instances where the guidance engine does not have enough information about a given customer, despite them having a primary banking relationship with a financial institution. Thus, customers can augment any of the estimated values, in which the guidance engine will update its outputs based on the additional information. Customer augmentations are possible for the different expense categories, income-related values, liquid assets, and high interest debt.

Transformations

As discussed above, multiple data points may be extracted from internal and external sources for Guidance Engine 220. While some of these can be used as-is, many may have to be transformed. Some of the critical data transformations leveraged by the Guidance Engine are discussed below. Such transformations listed below can occur in Guidance Engine 220 or by other computational resources, such as computing device 101. Such transformation systems may also be referred to as a featurization system, where the featurization system transforms the input data into a format appropriate for guidance engine 220.

Guidance engine 220 may also be configured to perform unit testing to ensure that all data transformation behave as expected. For example, for each transformation, fake data can be created that test a range of different edge cases, specific to the transformation itself. For example, if a data system is designed for aggregating customer banking balances to get their total amount of funds in savings, the fake data will include examples of customer ids with multiple associated balances, null values, etc. The testing infrastructure would run the associated transformation on this fake data, comparing its output to the expected values, alerting as to any differences. These unit tests are then leveraged to ensure that any new feature ready for deployment is using appropriate transformations, logic, and calculations.

Median values of Expense Categories: A standard procedure can be used for transforming transaction-level data into a customer's categorized monthly spend. For example, a year's worth of transaction data for each customer from both a financial institution and credit card providers can be used. Each transaction is categorized via relevant Merchant Category Codes. Merchant category codes may be used to associate individual financial institution and credit card transactions with different spending categories. These codes are defined by the card companies (e.g., Visa, Mastercard), where merchants are assigned a specific code based on their primary line of business at the point in time when they start accepting card payments. Note that not all transactions may contain an associated code.

Further, for each customer, the total spend per month in each expense category is summed for both financial institutions and credit card providers. The median monthly spend may then be calculated for each expense category over the span of a year. The interquartile ranges may also be calculated for each of the expense categories, to quantify month-to-month variability over the previous year. For a given customer and expense category, the median monthly spend from credit card providers and the median monthly spend from the financial institutions may be summed as their monthly spend.

To determine the overall variability in an expense category, the square root of the sum of the squares of the variability in financial institution and credit card provider monthly spend may be determined.

Total Monthly Spend: To estimate a customer's total monthly spend, a similar transformation may be used as detailed for categorized expenses. For each customer, the monthly outflow for both financial institutions and credit card transactions may be summed. The median and interquartile range (IQR) spend per month are then calculated, over the span of the previous year for both financial institutions and credit card providers. The sum of the median monthly spend from financial institutions and the median monthly spend from credit cards is a customer's total monthly spend. To determine the overall variability, the square root of the sum of the squares is taken of the variability in financial institution and credit card monthly spend.

Net Income: For some customers, their typical monthly credits to estimate their net income may be used. The data is transformed using a similar methodology to Monthly Spend and Expense Categories, as described below: For each customer, the sum of all credits deposited into bank accounts on a month-by-month basis is determined. Using a year's worth of data, the median and IQR of monthly credits as a proxy for net income is determined.

Total Minimum Payments for Credit Cards: To determine the total credit card minimum payments, the sum of the minimum payments of all credit cards reported in the credit bureau data may be calculated. For example, TransUnion provides information on up to 7 different revolving credit cards, sharing the balance and minimum payment. There is no information about the type of card, interest rate, and/or company. This information is also not available from any of the other credit bureaus, which aggregate across individual cards rather than sharing their individual information. Note that the card information provided by TransUnion includes minimum payments made.

Total Revolving Card Debt: For a customer with a financial institution, that institution has a wealth of information, from balances, to minimum payments, to terms and conditions. However, data on debt external to the financial institution is much more limited. Only TransUnion reports Credit Card data on an individual account basis, providing minimum payment and current balance due for up to 7 revolving credit cards.

Rather than aggregating, a summary of a customer's debt on an account-by-account level may be performed. Each account is a separate entry in a data dictionary and can contain financial information, for example, the last 4 digits of the account number as an identifier; annual percentage rate (APR); revolving balance (note that for external credit cards, this is the current balance so is not necessarily revolving); minimum payment due; interest cost to pay down debt by paying the minimum due every month; time to pay down debt by paying the minimum due every month.

Customers may also augment the data associated with their individual debt accounts within the guidance engine. For example, a customer can disclose an APR on an external credit card account, which can then be integrated into a debt data dictionary.

Gross Income: To estimate a customer's gross income values disclosed by the customer themselves are utilized, whenever available. Specifically, values supplied via credit card applications or requests for credit limit increases can also be used. However, because these values are not always kept up to date, only values provided within the past 3 years should be used. Additionally, for incomes more than one year old, they can be scaled by 3% per year, to account for typical pay increases Data Optimization: Once the input data has been appropriately transformed, the information may be optimized to be utilized by the guidance engine for a given customer. Data from both external and internal sources may be used where, for a given customer and data point, the best data available may be used, where "best" is defined by proximity to an individual customer. Augmented information from the customer is the highest priority, which a customer provides directly via the guidance engine API discussed above. Similarly, information based on a customer's transactions may take precedence over data sourced externally (e.g., estimates of a customer's monthly food costs based on actual transactions have a higher priority than estimated values based on their geography).

Calculations

Once the input information has been optimized, the guidance engine may perform a series of calculations as defined in the following categories.

Committed Monthly Expenses (CME).

Income: Income can be defined as Gross, Net, and Discretionary.

Emergency Fund: Emergency fund is classified as Emergency Fund Shortfall, Monthly Saving Goal Amounts, and Timescale to reach Emergency Fund Goal.

High Interest Debt: High interest debt is classified as Debt Paydown Strategies, cost benefit analyses, Monthly Debt Paydown Amounts, and Timescale to Paydown Debt, Confidence Scores: Confidence scores are metrics that quantify a level of accuracy for each guidance engine component.

Committed Monthly Expenses (CME): Committed Monthly Expenses may be defined as the total monthly fixed expenses incurred by a customer to cover their essential needs. These can be broken down into the following example, but not all inclusive, expense categories:

Childcare;
Credit Card Minimum Payments;
Food;
Housing;
Insurance;
Medical;
Phone/Cable/Internet;
Student Loan Payments;
Tax;
Transportation; and
Utilities.

The general protocol for estimating the above values is as follows:

1. User-augmented data whenever available.
2. In the absence of user-augmented data, Merchant Category Codes may be used. Total spend in a given category is the sum of the median values from financial institutions and credit card providers.
3. When transaction-based data is not available, Credit Bureau data can be utilized, including Student Loan Payments, External Credit Card Minimum Payments, Auto Loan Payments, Mortgage).
4. In the absence of transaction and bureau data, geographic benchmark estimates can be utilized. For each customer with a valid zip code, data on categorized cost-of-living from the MIT Living Wage Project and housing costs from the American Community Survey can be utilized. Note that value from the MIT Living Wage Project assume a single adult with no dependents. However, this limitation can be augmented based on each customer's household type.
5. If none of the above is available, the relevant value is set to null.

Any exceptions from the above general protocol is specified below in Table 2, table of calculations.

TABLE 2

Table of Calculations

| Category | Feature | Description of Logic | Benchmark | Variability Score | Reasonableness Score | Confidence score | Augmentable? | Source |
|---|---|---|---|---|---|---|---|---|
| COSTS | | | | | | | | |
| Home | Rent | 1. Median monthly costs based on transaction history of last 12 months of bank and/or card data. 2. If no values available, value set to null. | ACS | DEFAULT | DEFAULT | DEFAULT | N | 1. Rental-related transactions from Financial institution and card accounts, identified using MCC codes. |
| | Mortgage | 1. If IFM mortgage data is available, then it is used. 2. In the absence of 1, the maximum value of the monthly mortgage payments reported from Equifax, Experian, and TransUnion is used. 3. In the absence of these values, the value is set to null. | ACS | STDDEV | DEFAULT | DEFAULT | N | 1. Transactions related to mortgage payments from Financial institution accounts mined through a third-party platform called Insight Financial Marketing(IFM). 2. Mortgage Payments from the three credit bureaus-Equifax, Experian and TransUnion. |
| | Combined | 1. Augmented data is used whenever available. 2. If Rent and/or Mortgage costs calculated above, combine these values. 3. In the absence of 1 and 2, use the customer-reported housing costs associated with their credit card applications. 4. In the absence of 1, 2, and 3, use the ACS rent estimates | ACS | WEIGHTED | DEFAULT | DEFAULT | Y | 1. User Input 2. Combination of Rent and/or Mortgage Costs 3. Monthly Housing Costs from Customer Credit Card Application 4. ACS data for rent costs based on zip code |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | Utilities | based on customer's zip code.<br>5. If no data is available, set to null.<br>1. User-augmented data is used whenever available.<br>2. In the absence of augmented data, median monthly costs based on transaction history of last 12 months of bank and/or card data is used.<br>3. If no values available, value set to null. | N/A | DEFAULT | N/A | DEFAULT | Y | 1. User Input<br>2. Transactions designated as utilities from Financial institution and card accounts. Perform the categorization based on MCC. |
| Transportation | General Transport | 1. Median monthly costs based on transaction history of last 12 months of bank and/or card data.<br>2. If no data available, set to null | N/A | DEFAULT | N/A | DEFAULT | N | 1. Transactions related to general transportation costs from Financial institution and/or card accounts. Perform the categorization based on MCC. |
| | Auto | 1. If IFM auto payment data is available, it is used.<br>2. In the absence of 1, the maximum value of the monthly auto payments reported by Equifax, Experian, and TransUnion is used.<br>3. In the absence of 1 and 2, the median monthly costs based on transaction history of last 12 months of bank and/or card data is used.<br>4. If no values available, set to null. | N/A | STDDEV | N/A | DEFAULT | N | 1. Transactions related to auto payments from Financial institution accounts mined by IFM.<br>2. Auto Payments from the three credit bureaus-Equifax, Experian, and TransUnion.<br>3. Transactions related to auto from Financial institution and/or card accounts. Perform the categorization based on MCC. |
| | Combined | 1. User-augmented data is used whenever available.<br>2. If General Transport and/or Auto costs calculated above are available, combine these values.<br>3. In the absence of 1 and 2, COL estimates from MIT Living Wage data for a single person may be used.<br>4. If no values available, set to null. | MIT | WEIGHTED | DEFAULT | DEFAULT | Y | 1. User Input<br>2. Combination of General Transport and/or Auto Costs<br>3. COL data for Transportation costs based on MIT Living Wage estimates for a single person in customer's zip code |
| | Food | 1. User-augmented data is used whenever available.<br>2. In the absence of augmented data, median monthly costs based on transaction history of last 12 months of bank and/or card data is used.<br>3. In the absence of 1 and 2, COL estimates from MIT Living Wage data for a single person may be used.<br>4. If no values available, value set to null. | MIT | DEFAULT | DEFAULT | DEFAULT | Y | 1. User Input<br>2. Transactions related to Food from Financial institution and card accounts. Perform the categorization based on MCC (Merchant category Codes).<br>3. COL data for food costs based on MIT living wage estimates for a single person in customer's zip code. |
| | Medical | 1. User-augmented data is used whenever available.<br>2. In the absence of augmented data, median monthly costs based on transaction history of last 12 months of bank and/or card data may be used.<br>3. In the absence of 1 and 2, COL estimates from MIT Living Wage data for a single person may be used. | MIT | DEFAULT | DEFAULT | DEFAULT | Y | 1. User Input<br>2. Transactions related to Medical expenses from Financial institution and card accounts. Perform the categorization based on MCC (Merchant category Codes).<br>3. COL data for Medical costs based on MIT living wage estimates for |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | Childcare | 4. If no values available, value set to null.<br>1. User-augmented data is used whenever available.<br>2. In the absence of augmented data, median monthly costs based on transaction history of last 12 months of bank and/or card data may be used.<br>3. In the absence of 1 and 2, COL estimates from MIT Living Wage data for a single person, which is $0.00 for childcare may be used.<br>4. If no values available, value set to null. | MIT | DEFAULT | N/A | DEFAULT | Y | a single person in customer's zip code<br>1. User Input<br>2. Transactions related to Childcare from Financial institution and card accounts. Perform the categorization based on MCC (Merchant category Codes).<br>3. COL data for Childcare costs based on MIT living wage estimates for a single person in customer's zip code. For Childcare, this value is $0.00. |
| | Tax | 1. User-augmented data is used whenever available.<br>2. In the absence of augmented data, median monthly costs based on transaction history of last 12 months of bank and/or card data may be used.<br>3. In the absence of 1 and 2, COL estimates from MIT Living Wage data for a single person may be used.<br>4. If no values available, value set to null. | MIT | DEFAULT | DEFAULT | DEFAULT | Y | 1. User Input<br>2. Transactions related to Tax expenses from Financial institution and card accounts. Perform the categorization based on MCC (Merchant category Codes).<br>3. COL data for Tax costs based on MIT living wage estimates for a single person in customer's zip code |
| | Insurance | 1. User-augmented data is used whenever available.<br>2. In the absence of augmented data, median monthly costs based on transaction history of the last 12 months of bank and/or card data may be used.<br>3. If no values available, value set to null. | N/A | DEFAULT | N/A | DEFAULT | Y | 1. User Input<br>2. Transactions related to Insurance expenses from Financial institution and card accounts. Perform the categorization based on MCC (Merchant category Codes).<br>3. COL data for Insurance costs based on MIT living wage estimates for a single person in customer's zip code |
| Debt Payment | Student Loan Payments/ Balance | 1. User-augmented data is used whenever available.<br>2. In the absence of 1, the monthly student loan payments reported by Experian may be used.<br>3. If no values available, set to null. | N/A | N/A | N/A | 1. Set to 1.0 for user-augmented data.<br>2. Otherwise set to 0.0. | Y | 1. User Input<br>2. Monthly Student Loan payment reported from Experian. |
| | Credit Card Minimum Payment | 1. The minimum monthly payment reported by internal Card data is used.<br>2. In the absence of 1, value is set to null. | N/A | N/A | N/A | 1. Set to 1.0 if use internal card data.<br>2. Otherwise set to 0.0. | N | 1. Credit card minimum monthly payments from internal data. |
| | External Credit Card Minimum Payment | 1. User-augmented data is used whenever available.<br>2. In the absence of 1, reported monthly minimum payments on up to 7 bankcards from TransUnion may be used.<br>3. In the absence of 1 and 2, value is set to null. | N/A | N/A | N/A | 1. Set to 1.0 for user-augmented data.<br>2. Otherwise set to 0.0. | Y | 1. User Input<br>2. Minimum monthly payments reported by TransUnion. |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | Committed Monthly Expenses | 1. User-augmented data is used whenever available.<br>2. In the absence of 1, this value is the sum of all the individual costs that make up a customer's CME, listed above.<br>3. In the absence of 1 and 2, COL estimates from MIT Living Wage data for a single person may be used.<br>4. If no values are available, set to null. | MIT | WEIGHTED | DEFAULT | DEFAULT | Y | 1. User Input<br>2. Costs listed above.<br>3. COL data for total living costs based on MIT Living Wage estimates for a single person in customer's zip code. |
| | | | | SPEND | | | | |
| | Total Monthly Spend | 1. User-augmented data is used whenever available.<br>2. In the absence of 1, take the sum of the median monthly debits on a customer's card and bank accounts.<br>3. In the absence of 1 and 2, value is set to null. | N/A | DEFAULT | N/A | DEFAULT | Y | 1. User Input<br>2. All debits from customer bank and card accounts. |
| | Flexible Monthly Spend | 1. User-augmented data is used whenever available.<br>2. If Total Monthly Spend and CME values are available, calculate this as the difference (Total Monthly Spend-CME)<br>3. In the absence of 1 and 2, value is set to null. | N/A | WEIGHTED | N/A | DEFAULT | Y | 1. User Input<br>2. Committed Monthly Expenses and Total Monthly Spend estimates listed above |
| | | | | INCOME | | | | |
| Income | Annual Gross Income | 1. User-augmented data is used whenever available.<br>2. In the absence of 1, the income supplied by a customer during their credit card application is used. Use only data provided within the last three years and scale it up by 3% per year.<br>3. In the absence of 1 and 2, TALX income from internal Bank sources is used.<br>4. In the absence of the above values, gross income estimates from the MIT Living Wage data is used.<br>5. If none of the above are available, the ACS values of gross income per capita is used.<br>6. If none of the above are available, value set to null. | MIT | N/A | If uses CC application or TALX data, takes the average of the default reasonableness score and the Ability to Pay (ATP) reasonableness score. The ATP score utilizes employment and FICO data to determine whether or not a customer's reported income is viable (e.g., if a customer is listed as Employed with a FICO Score below 600, ATP does | DEFAULT | Y | 1. User Input<br>2. Customer-supplied income from Credit Card Applications<br>3. TALX Income from Bank data<br>4. MIT Living Wage estimates for gross income for a single person in customer's zip code<br>5. ACS Gross Income per capita. |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | Net Monthly Income | 1. User-augmented data is used whenever available.<br>2. In the absence of 1, salary information from IFM is used.<br>3. In the absence of 1 and 2, leverage a customer's tax and medical costs in conjunction with a customer's Gross Income is used. If the reasonableness score of tax and/or medical costs is greater than 0.5, assume that these costs are not taken out of customer's pay. Thus, monthly Gross and Net Income are comparable.<br>4. If the reasonableness scores for tax and/or medical are below 0.5, this suggests that these payments are automatically withdrawn from a customer's pay. The MIT Living Wage estimates to determine customer's expected costs of insurance and tax and deduct this from their Gross Income to determine Net Income is used.<br>5. If the MIT data is unavailable, assume that medical costs are 5% of Gross Income and tax costs are 22%. Deduct these amounts from Gross Income to estimate Net Income.<br>6. In the absence of augmented values or Gross Income, the median monthly credits into a customer's bank accounts may be used.<br>7. In the absence of above values, the net income estimates from the MIT Living Wage data may be used.<br>8. If none of the above are available, set to null | MIT | 1. If using customer's tax and medical costs, use the WEIGHTED variability score from these values.<br>2. If using median monthly credits, DEFAULT variability score. | not expect an income higher than $100,000. DEFAULT | DEFAULT | Y | 1. User Input<br>2. Salary data from IFM<br>3. Annual Gross Income<br>4. Tax and Medical Costs<br>5. Transactions related to deposits in Financial institution accounts<br>6. MIT Living Wage estimates for net income for a single person in customer's zip code |
| | Monthly Discretionary Income | 1. User-augmented data is used whenever available.<br>2. In the absence of augmented data, calculate the discretionary income as Net Monthly Income-CME.<br>3. In the absence of CME, the benchmark value of 50% of Net monthly Income as discretionary income is used.<br>4. If no values available, value set to null. | 50% of Net Monthly Income | WEIGHTED | DEFAULT | DEFAULT | Y | 1. User Input<br>2. Net monthly income and CME determined in steps above. |
| ASSETS | | | | | | | | |
| Liquid Assets | | 1. The total balance in a customer's personal Financial institution checking and savings accounts may be used.<br>2. Customers can augment.<br>3. In the absence of 1 and 2, IXI estimates for liquid assets may be used. | IXI | N/A | DEFAULT | DEFAULT | N, Customer can augment their Exter- | 1. Financial institution checking and savings account balances.<br>2. User augmented data on assets earmarked for emergencies.<br>3. IXI data for customer's savings estimate. |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | | 4. If no values available, value set to null. | | | | | | nal Assets and Internal assets intended for emergencies |
| EMERGENCY FUND | | | | | | | | |
| | Emergency Fund Shortfall | 1. In they have less than 1 CME saved up, their shortfall is their CME-Liquid Assets. 2. If they have less than 3 CME saved up, their shortfall is (3*CME-Liquid Assets.) 3. If they have < 6 CME the value is set to (6*CME-Liquid Assets). 4. If they have > 6 CME saved up, the shortfall is 0. | N/A | N/A | N/A | Average of CME and Liquid Assets confidence scores | (Y) | 1. User Input. Note that while the GE can currently accept augmented shortfall values. 2. Liquid Assets and CME to determine the shortfall identified by the FBP Standard |
| | Emergency Fund Save Rate | 1. If customer is eligible for Emergency Savings alone, the FBP Standard recommended value of 10% is used. 2. If they are eligible for both High Interest Debt Paydown as well as Emergency Savings, the 10% is split between them equally. 3. If they are not eligible for a savings recommendation, it is set to 0%. | N/A | N/A | N/A | 1 | (Y) | 1. User Input. Note that while the GE can currently accept augmented savings rate. 2. Liquid Assets, CME and Debt values to determine the FBP Standard recommendation. |
| Emergency Fund Timescale | Monthly Payments | 1. If Discretionary income and Emergency Fund save rate are all available, determine a customer's recommended monthly saving amount by simply multiplying the save rate by their discretionary income: (EF save rate * discretionary) 2. If none of the above combinations are available, the monthly payment is set to null. | N/A | N/A | N/A | N/A | N | 1. Discretionary Income and Emergency Fund Save rate estimated in steps above. |
| | Timescale | 1. If Emergency Fund Shortfall and Monthly Payments are all non-null, the timescale is calculated as: EF Shortfall/ Monthly Payments. 2. If none of the above combinations are available, the timescale is set to null. | N/A | N/A | N/A | AVERAGE of confidence scores of Discretionary Income and EF Shortfall | N | 1. Monthly Payments and Emergency Fund Shortfall values estimated in steps above. |
| HIGH INTEREST DEBT | | | | | | | | |
| High Interest Debt | Debt Principal | The revolving debt principal that was not paid off by the customer, which is the interest-bearing component of credit card debt. | N/A | N/A | N/A | 1 | N | 1. Average Daily Balance from card statements table for a customer. |
| | APR | The interest rates on the Credit Card. | N/A | N/A | N/A | 1 | N | 1. APR designated for Credit Card purchases |
| | Minimum Payment | The minimum payment that a customer has to make each cycle towards their credit card debt. | N/A | N/A | N/A | 1 | N | 1. Minimum Payment pulled from internal card statements table. |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| External High Interest Debt | Cost to Paydown Making Minimum Payments | The total cost that a customer would have to spend if they paid off their current debt using the minimum payments only. | N/A | N/A | N/A | 1 | N | 1. Minimum payment costs pulled from internal card statements table. |
| | Time to Paydown Making Minimum Payments | The total time that it takes a customer to pay off their debt if they make the minimum payments only. | N/A | N/A | N/A | 1 | N | 1. Minimum payment time pulled from internal card statements table. |
| | Debt Principal | 1. User-augmented data is used whenever available. 2. If 1 is not available, the current balance for the card reported by Trans Union is used. | N/A | N/A | N/A | If user augments, set to 1.0. Otherwise set to 0.0. | Y | 1. Prioritize customer augmented data here, but also have a current balance due from TransUnion for up to 7 cards. |
| | APR | The interest rates on the External Credit Card. | N/A | N/A | N/A | If user augments, set to 1.0. Otherwise, set to 0.0. | Y | 1. User Inputs/Augmented only. |
| | Minimum Payment | The minimum payment that a customer has to make each cycle towards their credit card debt. | N/A | N/A | N/A | If user augments, set to 1.0. Otherwise, set to 0.0. | Y | 1. Augmented data is used whenever possible. 2. If augmented data is not available, minimum payment information from TransUnion for up to 7 individual cards is used |
| HIGH INTEREST DEBT-CALCULATIONS | | | | | | | | |
| Pay Rates | Debt Pay Rate | Payrate is a percentage of discretionary income between 0 and 10% depending on customer's financial state. | N/A | N/A | N/A | 1 | Y | Defined by the FBP Standard recommendation. |
| Debt_<STRATEGY><DEBT TYPE> | Recommended Monthly Payments | Combination of the minimum payments and the percentage of discretionary income FBP Standard dictates customer use for Debt Paydown | N/A | N/A | N/A | Debt balance ratio | N | 1. Minimum payments, discretionary income, and Debt Payrate. |
| | Timescale | 1. Using the recommended monthly payments and estimate of total debt, calculate the number of months required to paydown debt. | N/A | N/A | N/A | Debt balance ratio | N | 1. Debt principal, Monthly Payments, APR |
| | Total Cost | The total cost combines the debt principal with the interest owed for each of the various debt accounts. | N/A | N/A | N/A | Debt balance ratio | N | |
| | Interest Paid | The total Interest cost for customer using this paydown strategy | N/A | N/A | N/A | Debt balance ratio | N | |
| | Strategy | Paydown Strategy used | N/A | N/A | N/A | N/A | N | Avalanche/Snowball/Minimum |
| | APR Cutoff | Paydown calculations done for either HID (>7% APR) or All debts (>=0% APR) | N/A | N/A | N/A | N/A | N | 0 or 7 |
| | Debt Accts | Dictionary of each of the associated debt accounts, their paydown timescales, cost, interest cost, etc. | N/A | N/A | N/A | N/A | N | |
| Lump Payment (for Minimum/Snowball/Avalanche Strategies) | Total Lump Payment | 1. User-augmented data is used whenever available. 2. If they have less than < 3 CME saved up or < 3 months of payable debt, then it is set to 0. 4. If they have > 3 CME and > 3 months of payable debt, the value is set to Liquid Assets- 3*CME. (Bringing them down to 3 CME of savings). | N/A | N/A | N/A | Debt balance ratio | Y | 1. User Inputs. 2. Emergency Fund, Debt Paydown times and Liquid assets to determine the FBP Standard. |

TABLE 2-continued

Table of Calculations

| Category | Feature | Description of Logic | Benchmark | Variability Score | Reasonableness Score | Confidence score | Augmentable? | Source |
|---|---|---|---|---|---|---|---|---|
| | Debt Accts | Dictionary of each of the associated debt accounts, their paydown timescales, cost, interest cost, etc. Has the lump payment amount devoted to each account based on paydown Strategy | N/A | N/A | N/A | N/A | N | |
| | Remainder is the same as Debt_<STRATEGY><DEBTTYPE> | | | | | | | |
| Debt Cost Time Savings | HID | Compares the Cost and Time difference between all different paydown strategies for High Interest Debt | N/A | N/A | N/A | Debt balance ratio | N | |
| | All | Compares the Cost and Time difference between all different paydown strategies for All Debt | N/A | N/A | N/A | Ratio of balances of Debt with information to all Debts | N | |

Income: The guidance engine determines multiple variations on a customer's income and that may include gross income, net income, and discretionary income. Gross income is defined as a customer's annual pre-tax income. Data sources for this value are prioritized as follows:
  customer-augmented values;
  gross income disclosed in credit card applications from up to 3 years ago, where if the customer-reported income is more than 1 year old, it may be scaled up, e.g., by 3% per year, to account for annual increases in salary;
  TALX Projected Income defined as payroll data purchased from Equifax and sourced from employers that is updated every 6 months, but limited to customers required to show proof-of-income;
  MIT Living Wage estimates of minimum gross income for customer's county;
  ACS estimate of gross income per capita; and
  if none of the above are available, the value is set to null.

Net income is a customer's monthly income post any deductions (e.g., tax, medical insurance, wage garnishment). Data sources for this value are prioritized as follows:
  customer-augmented values;
  net salary data from third party sources;
  gross income as described above, using estimates of tax and medical costs for each customer, gross annual income can be transformed into net monthly income;
  median monthly credits posted to customer's bank accounts, where each customer's accounts over the previous year may be used to estimate the typical monthly deposits;
  MIT living wage estimates of minimum net monthly Income for customer's county; and
  if none of the above are available, the value is set to null.

Finally, each customer's discretionary income may be calculated where the outstanding amount of net monthly income available after a customer has covered their committed monthly expenses. In other words:

Discretionary Income=Net Monthly Income−CME

Emergency Fund: The guidance engine examines each customer's emergency fund, e.g., the amount of liquid assets available to cover Committed Monthly Expenses should something unexpected happen. This analysis may include the following data points:
  Liquid Assets. For each customer, the funds available in a customer's personal accounts, for example, a customer's checking and savings account, are combined. Note that amounts can be from a prior period and may undergo volatility. Customers have an opportunity to augment this value via the guidance engine API, specifying a specific subset of the balance that can be used in an Emergency. Additionally, customers can leverage augmentation to inform the guidance engine about other liquid assets that can be used in an emergency.
  Committed Monthly Expenses, a customer's must-pay monthly expenses, as previously described above.
  Discretionary Income, the amount of net monthly income left over once a customer has taken care of their CME, described above.

For each customer, the guidance engine calculates/returns the following:
  Emergency Fund—the number of Months of CME saved as Liquid Assets.

$$EF = \frac{\text{Liquid Assets}}{CME}$$

Emergency Fund Savings Goal—this monetary value is defined by the FBP Standard. Depending on a customer's financial picture, this goal is 1, 3, or 6 months of CME.
  Emergency Fund Shortfall—the amount a customer needs to save to reach their Emergency Fund goal identified by the FBP Standard $EF$ Shortfall=$EF$ Goal−Liquid Assets Emergency Fund Save Rate—the percentage of a customer's discretionary income the FBP Standard recommends they allocate towards their Emergency Fund. This value varies from 0 to 10%.

Emergency Fund Timescale—the number of months required by customer to achieve their Emergency Fund goal if they save the recommended amount per month $$\frac{EF\ \text{Shortfall}}{EF\ \text{Save Rate} * \text{Discretionary Income}}$$

High Interest Debt (HID): In addition to Emergency Fund, the guidance engine may also provide advice to customers on how to tackle their High Interest Debt. HID is defined as any loan with an interest rate above a threshold rate, for example. 7% and higher. The threshold rate is set such that the guidance engine Debt component may focus on high interest revolving Credit Card debt.

As previously explained, a dictionary of revolving card debt accounts, with information on minimum payments, revolving balance, etc. is organized on an account-by-account basis. In addition to a customer's high interest debt, information about other debts the customer may have, such as mortgages, auto loans, and student loans may also exist. This information comes from at least the credit bureaus. Within the guidance engine this information can be added to the card debt dictionary, creating a single dictionary that contains information on each customers' total debt load. As with the card debt accounts, customers will be able to augment these values via the guidance engine API, providing the opportunity to learn about their interest rates, etc. without requiring them to aggregate.

Combining all debts into a single dictionary provides the ability to determine paydown times/costs for high interest debt and all debts with the same codebase. It also provides a foundation for how to integrate debt accounts that customers disclose via aggregation. Note that if a debt account in a dictionary is missing some critical values (e.g., APR, revolving balance, minimum payment), it cannot include it in a debt account calculation. Thus, augmentation is critical to debt calculations.

Utilizing the dictionary of debt accounts, the guidance engine may calculate the following:

Total Debt Principal—the combination of revolving balances on which interest is charged that can be distinguished as High and Low interest debt;

Debt Paydown Rate—the percentage of a customer's discretionary income the FBP Standard recommends they allocate towards paying down High Interest Debt that can vary from 0 to 10%;

Monthly Payments—the sum of a customer's current total minimum payments and the amount associated with their debt paydown rate that may be calculated as:

Minimum Payment+(Debt Pay Rate*Discretionary Income)

Cost and Time to paydown debt based on one of many various paydown strategies—the guidance engine may calculate values based on different priorities. For example, tackling debt with the highest interest rate first or by paying down debt with the smallest revolving balance first. For both of these strategies, once a debt is paid down, the monthly payments associated with it rolls over to help customers pay down the next debt. For Minimum payment, customers pay only their current minimum payment due on a debt, and the amounts don't roll over between accounts. While a customer's minimum payment due decreases as their balance decreases, the protocol for defining a minimum payment varies dramatically with the debt issuer, making it difficult to accurately calculate; consequently, the current value may be used, rather than having the minimum payment decreasing over time.

Lump Payments—If a customer has a High amount of high interest debt and more than 3 months' worth of CME in liquid assets, they are eligible to make a Lump Payment towards their High Interest Debt. This value is calculated as follows:

Lump Payment=Liquid Assets−(3*CME)

Lump payment options may be integrated into all of the different paydown strategy calculations, allotting lump payments according to tackling debt with the highest interest rate first or by paying down debt with the smallest revolving balance first strategies and outputting the amount devoted to each individual debt account. Whether customers want to devote lump payments to high interest debt alone or all of their various debt accounts may also be modeled.

Cost and Time Savings—For each customer, the total cost and time required to paydown debt across the different available strategies are compared. This allows customers to make an informed decision about which strategy will work best for them.

Confidence Scores: The guidance engine API encourages customers to correct guidance engine financial estimates when they are inaccurate. In tandem with this, a metric called Confidence scores also exists, which provides a quantitative way to measure the relative accuracy of any estimated values and recommendations. Consisting of two components, a Reasonableness Score and a Variability Score, Confidence Scores range from 0, where there is no confidence, to 1, where there is a strong belief that the estimated values are accurate. It may also factor in data sourcing information, prioritizing augmented, internal, and external data in that order. Every value output by the guidance engine has an associated Confidence Score.

Initially, Confidence Scores provide a valuable metric to prioritize further guidance engine work. For example, if customers are changing values by a significant amount that were initially were held in high confidence, those estimates need to be improved.

Reasonableness Score: This score is a measure of how reasonable guidance engine values are and how close those values are to a benchmark value. For example, a benchmark source is the MIT Living Wage Cost of Living data, associated with a customer's location and assuming a single adult living on their own with no dependents. Another benchmark source is third-party data, e.g., external data from IXI and ACS. And, yet another benchmark source is the use of financial guidelines, for example, a customer's discretionary income should be about half their net monthly income. Unreasonable values have scores close to 0; those that are reasonable are close to 1.

1. When the estimated value is smaller than the benchmark, the reasonableness score is the ratio of the estimated value to the COL estimate. The smaller the value, the smaller the reasonableness score.
2. When the calculated value is between 1 and 3 times the benchmark estimate, the reasonableness score is set to 1. Benchmark values are based on a single adult with no dependents. By expanding the acceptable range of benchmark values, the guidance engine can better account for customers hailing from all types of households.
3. When the calculated value is greater than 3 times the benchmark estimate, the reasonableness score is degraded, as the calculated value seems excessively high. The score is then defined as the ratio of the benchmark estimate to the estimated value; the larger the estimated value, the smaller the reasonableness score.
4. In the absence of benchmark estimates, the value is set to null.

A summary of the Reasonableness Score formula is below:

Reasonableness Score =
$$\begin{cases} \frac{value}{benchmark} & value < benchmark \\ 1.0 & benchmark < value < 3*benchmark \\ \frac{benchmark}{value} & value > 3*benchmark \end{cases}$$

Variability Score: When a particular value exhibits large amounts of variation (e.g., over time, between bureaus, etc.), there is less confident in the accuracy of the guidance engine estimates. This confidence is quantified as the Variability Score, which reflects the volatility of the estimated value. The general protocol is as follows:
1. When possible, the IQR is estimated for each component of the calculation. For data points that are not variable over time, other measures may be used. For example, rather than IQR, the standard deviation across the credit bureaus may be used to estimate the variability of a customer's total monthly mortgage payments. Due to the low number of points included in the standard deviation, the sample standard deviation is utilized rather than the population standard deviation. Additionally, IQR and standard deviation cover a different percentage of the distribution. Thus, all calculations are scaled using standard deviation by a factor or 1.348, such that it better reflects 50% of the sample and is comparable to IQR.
2. The variability score is calculated as:

$$1 - \frac{IQR}{value}$$

where value is the amount calculated by the Guidance Engine in the given category and, when IQR is not available, same formula with standard deviation may be used.
3. If the Variability Score is negative, meaning that the IQR is larger than the value, it is set to 0.0.
4. In the absence of IQR, or an analogous measure of variation, the Variability Score is null. The basic formula is summarized below:

$$\text{Variability Score} = \begin{cases} 1 - \frac{IQR}{value} & 0 < \text{var score} < 1 \\ 0 & \text{var score} < 0 \end{cases}$$

5. For some initial calculations, data from multiple sources is combined (e.g., using transaction data from both financial institutions and credit cards to calculate categorized costs). To determine the variability of the total value, the square root of the sum of squares for each component is calculated:

$$\sqrt{IQR_a^2 + IQR_b^2}$$

6. When multiple components are combined for certain calculations (e.g., CME is a combination of Food, Medical, Housing costs, etc.), their variability scores are weighted to determine the variability score for the final value. This protocol factors in the level of importance for each component, ensuring that the final confidence scores are penalized when large values are highly variable. The formula is as follows:

$$\frac{(Value_a * \text{Var } Score_a) + (Value_b * \text{Var } Score_b)}{(Value_a + Value_b)}$$

Confidence score: The Confidence score is a unified measure of the Variability and Reasonableness Scores. It quantifies an overall confidence in the accuracy of each guidance engine output. This score is calculated using the following steps:
1. When there is both a Variability and Reasonableness Score, the Confidence Score is the average of the two.
2. If there is only the Variability Score, the Confidence Score equals the Variability Score. There is no penalty for a lack of Reasonableness Scores as benchmarks are not always available and variability is in closer proximity to the data itself.
3. If there is only the Reasonableness Score, the Confidence Score is set to one half of the Reasonableness Score estimate (to penalize the lack of Variability Score).
4. If neither score is available, the value is set to 0.
5. If the data point came from external, rather than internal data, the confidence score is set to 0.0.
6. If the data point came directly from Augmented data, the confidence score is set to 1.0.

Note that a different technique may be used to calculate confidence scores for the debt calculations. If some critical information is absent for various debt accounts, those cannot be included in the calculations. The debt confidence scores are the ratio of the debt balances where the needed information is present to those that are not present. For example, if there are 3 debt accounts of $1000, $5000, and $10000, but the necessary information is only present for only the $10000 account, the confidence score will be (10000)/(1000+5000+10000)=0.625. If the information is present for only the $1000 account, the confidence score will be (1000)/(1000+5000+10000)=0.0625, as there is less confidence in the paydown calculations due to a lack of information. Note that this may result in some very low confidence scores for individuals with mortgages, auto loans, student loans.

Decision Tree: Once the Inputs component is complete, its output may be passed to the decision tree component of the guidance engine. This portion identifies each customer's financial recommendation, based on an in-house FBP Standard. It outlines the recommended pathway for a customer to become financially healthy and eligible to invest. In an embodiment, the FBP Standard focuses on helping customers build up their emergency fund and pay down their high interest debts.

The guidance engine may use the following data points in the Decision Tree:
- Emergency Fund—Number of Months of CME saved up in Liquid Assets
- High Interest Debt—High Interest Debt Pay-down Timescale utilizing the strategy that encourages customers to tackle debt with the highest interest rate first
- Discretionary Income—Amount customer has to spend once they have taken care of CME For each customer, each value is compared to benchmark values. For the Emergency Fund, the following benchmark amounts may be used:
- Invalid value—guidance engine is unable to calculate a customer's emergency fund as it lacked necessary data elements.
- <1 CME—Customer needs to prioritize saving over all other goals.
- 1-3 CME—Customer needs to save more for their Emergency Fund but can also pay down any high interest debt with recurring payments in parallel.
- 3-6 CME—Customer needs to save more for their Emergency Fund but can also pay down any high interest debt with Lump payments and/or recurring payments in parallel.
- >6 CME—Barring no high interest debt, customer is ready to invest.

For high interest debt, benchmarks based upon timescales may be used for each customer to pay down their debts:
- Invalid value—when the guidance engine is unable to calculate a customer's High Interest Debt due to the absence of a necessary data element;
- Zero debt—No Revolving High Interest Debt
- <3 Months to pay down debt—Moderate Revolving High Interest Debt, which a customer can pay off with recurring payments if applicable.
- >3 Months to pay down debt—High Revolving High Interest Debt, which the customer can pay off with Lump payments and/or recurring payments if applicable.

These benchmarks are compared with the time required for a customer to pay down their high interest debt (anything with an APR greater than 7%) using the strategy that encourages customers to tackle debt with the highest interest rate first and devoting 5-10% of their discretionary income to monthly payments, in addition to the minimum payments.

For discretionary income, determination needs to be made as to whether or not the guidance engine can provide constructive guidance for customers. Specifically, if the customer has no money left over after they pay for critical monthly expenses, they cannot allocate funds to their Emergency Fund or pay down High Interest Debt. Thus, the following benchmarks may be used for discretionary income:
- Invalid value—guidance engine is unable to calculate Discretionary Income as lacking necessary data elements
- No Discretionary Income—Customer's calculated Discretionary Income is less than or equal to zero, due to CME being greater than or equal to their Net Monthly Income
- Valid Discretionary Income—Customer's calculated Discretionary Income is greater than zero.

Note in the benchmarks above that when faced with data gaps the guidance engine will still provide a recommendation based on the limited information it does have, while also indicating data insufficiency.

If Discretionary Income data is unavailable, "NeedDiscIncome" is included in the Recommendation.

If Emergency Fund data is unavailable, "NeedAssets" is included in the Recommendation.

If High Interest Debt data is unavailable, "NeedDebt" is included in the Recommendation.

If both are unavailable, the guidance engine returns "NeedAssets_NeedDebt" as the only recommendation.

A summary of the Guidance Engine recommendations, based on data sufficiency and a customer's location in the FBP Standard, is shown in Table 3 below:

TABLE 3

Guidance Engine Recommendations

| Recommendation | Emergency Fund | High Interest Debt | Discretionary Income |
| --- | --- | --- | --- |
| NeedAssets_NeedDebt | N/A | N/A | N/A |
| NeedDiscIncome | Any Value | Any Value | N/A |
| NoDiscIncome | Any Value | Any Value | ≤0 |
| 0to1CMESaveMore | <1CME | Any Value | >0 |
| 1to3CMESaveMore | 1 CME < EF < 3 CME | None | >0 |
| 1to3CMESaveMore_PayDownModerateDebt | 1 CME < EF < 3 CME | <3 Months to Paydown | >0 |
| 1to3CMESaveMore_PayDownHighDebt | 1 CME < EF < 3 CME | >3 Months to Paydown | >0 |
| 1to3CMESaveMore_NeedDebt | 1 CME < EF < 3 CME | N/A | >0 |
| 3to6CMESaveMore | 3 CME < EF < 6 CME | None | >0 |
| 3to6CMESaveMore_PayDownModerateDebt | 3 CME < EF < 6 CME | <3 Months to Paydown | >0 |
| 3to6CMESaveMore_PayDownHighDebt | 3 CME < EF < 6 CME | >3 Months to Paydown | >0 |
| 3to6CMESaveMore_NeedDebt | 3 CME < EF < 6 CME | N/A | >0 |
| InvestingReady | EF > 6 CME | None | >0 |
| PayDownModerateDebt | EF > 6 CME | <3 Months to Paydown | >0 |
| PayDownHighDebt | EF > 6 CME | >3 Months to Paydown | >0 |

TABLE 3-continued

Guidance Engine Recommendations

| Recommendation | Emergency Fund | High Interest Debt | Discretionary Income |
|---|---|---|---|
| NeedDebt | EF > 6 CME | N/A | >0 |
| NeedAssets | N/A | None | >0 |
| NeedAssets_PayDownModerateDebt | N/A | <3 Months to Paydown | >0 |
| NeedAssets_PaydownHighDebt | N/A | >3 Months to Paydown | >0 |

Outputs

The final outputs of the guidance engine include both the calculated values, accuracy metrics, origin flags, and final recommendations. For each of the output categories return origin flags are generated, indicating where the data originated, variability, reasonableness, and confidence scores, and the estimated value.

Method

Figure 4:
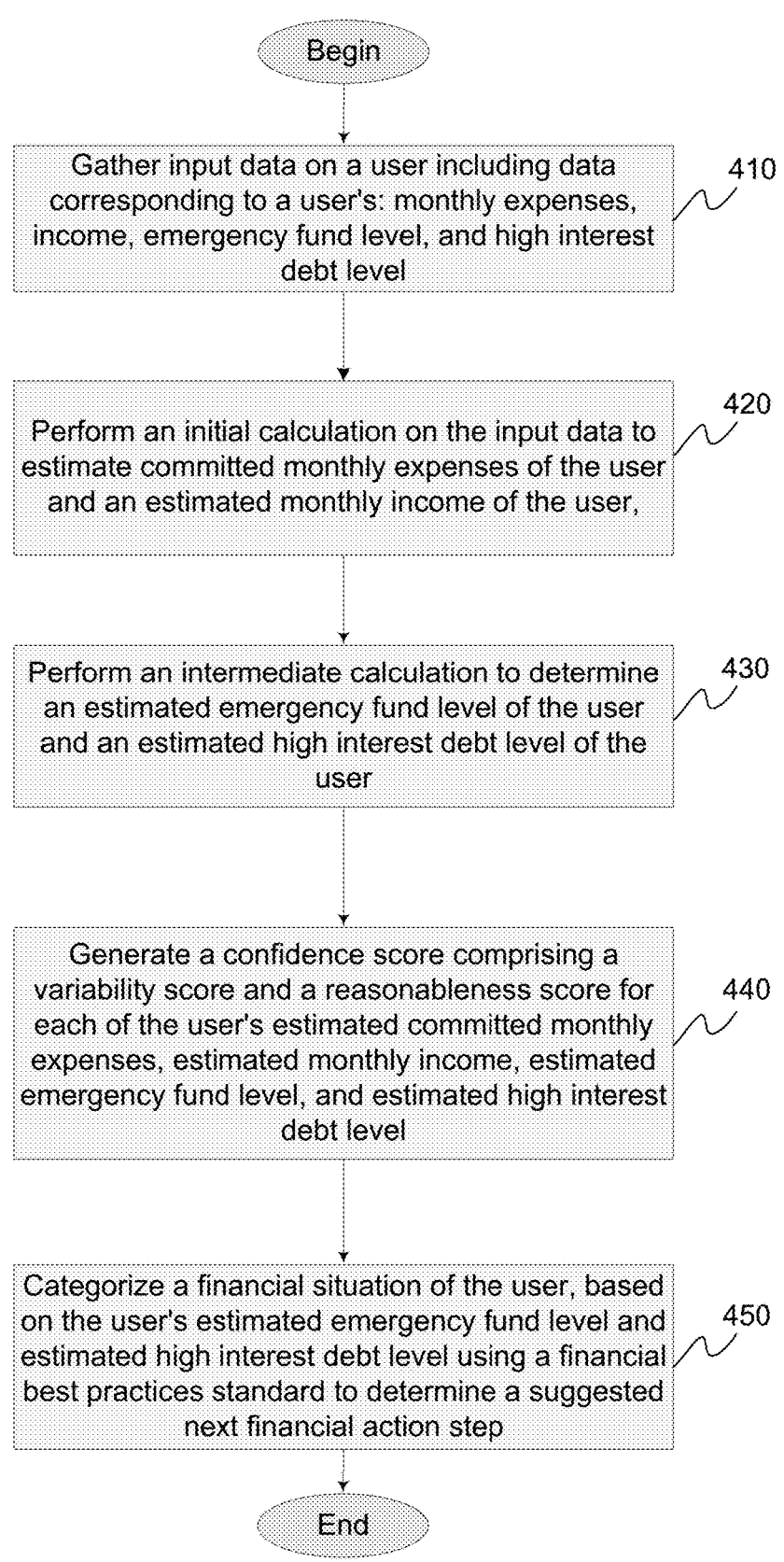
FIG. 4 depicts a flow diagram of a guidance engine method in accordance with one or more illustrative aspects discussed herein.

FIG. 4 depicts a flow chart of an example method 400 for a guidance engine to provide an automated method for providing financial guidance, according to one or more aspects of the disclosure. In step 410, input data is collected for a user or customer. The input data focuses on that user's expenses on a monthly bases, their income, an emergency fund level and the amount of high interest debt. Input data can exist within a financial institution, especially if the user is a customer of that financial institution. Internal input data can include banking related data, such as the balances in a user's checking and savings account. Internal input data can also include credit card data including balances, credit limits, annual percentage rates, minimum payments and the like. Internal input data can also include credit bureau data, such as data from Equifax, Experian and TransUnion. Input data can also originate from external data sources such as cost of living estimates from the Massachusetts Institute of Technology Living Wage Estimates and the American Community Survey data. Thus, input data can consist of actual user data and from external sources, which are primarily used when internal or user supplied data is unavailable.

At step 420, an initial calculation is may be performed on the input data gathered in step 410. The initial calculation may include transforming the data into standardized formats for compatibility and to optimize and integrate the data used for a given customer based on availability to ensure the best data available for each customer. Ensuring the best data available is also referred to as data optimization. The initial calculation is directed to calculating an estimated committed monthly expenses level of the user. It is also used to estimate the monthly income of the user. The committed monthly expenses is defined as the total monthly fixed expenses incurred by the customer to cover their essential needs. These needs include items such as childcare, credit card minimum payments, food, housing insurance, medical, phone, loan payments, taxes, transportation, utilities and the like.

Monthly income may include calculating gross income, net income, and discretionary income. Gross income is defined as the customer's annual pre-tax income. Net income is a customer's monthly income less any deductions such as taxes, insurance, and garnishments. Discretionary income is defined as the outstanding amount of net monthly income available after a customer has covered their committed monthly expenses.

At step 430, an intermediate calculation is made to determine an estimated emergency fund level and an estimated high interest debt level of the customer. A customer's emergency fund is defined as the amount of liquid assets they have available to cover committed monthly expenses should something unexpected happen. Further, the estimated high interest debt level comprises a loan with an interest rate above a pre-set threshold, e.g., above 7%. This analysis utilizes the level of liquid assets of the customer, their committed monthly expenses, the amount of discretionary income. Further, the customer can also have an emergency fund savings goad that is defined by the FBP standard where the goal is 1, 3 or 6 months of committed monthly expenses.

At step 440, a confidence score and variability score is generated for each of the estimated values, including the committed monthly expenses, monthly income, emergency fund level and high interest debt level. A confidence score provides a quantitative method to measure the relative accuracy of the estimated value and recommendations. A confidence score consists of two components, a reasonableness score and a variability score. Confidence scores range from 0, indicating no confidence, to a 1, where there is complete confidence that the values are accurate. The confidence also factors in the source of the data that is prioritized as being augmented, internal, and then externally sourced.

The reasonableness score is a measure of how reasonable the guidance engine estimated values are, or how close are the estimated values to a benchmark value. The benchmark values come from external sources such as the MIT Living Wage Cost of Living data, or the American Community Survey. As discussed above, a summary of the reasonableness score formula is as follows:

Reasonableness Score =

$$\begin{cases} \frac{value}{benchmark} & value < benchmark \\ 1.0 & benchmark < value < 3*benchmark \\ \frac{benchmark}{value} & value > 3*benchmark \end{cases}$$

The variability score indicates the amount of variation, either over time or between different sources and reflects the volatility of an estimated value. The variability score is based on the interquartile range (IQR) amount for each component of the calculation and is calculated as follows:

$$1 - \frac{IQR}{value}$$

where "value" is the amount calculated by the guidance engine in the given category. Also, if the IQR is not available, the same formula may be used, but with standard deviations.

At step 450, the financial situation of the user is categorized based on the user's estimated emergency fund level and the estimate high interest debt level. The categorization may use a financial best practices standard to suggest a next financial action step. A summary of the actions associated with the various levels of emergency fund and high interest debt load are reproduced below:

| Emergency Fund | High Interest Debt Load | | |
| --- | --- | --- | --- |
| | None | Moderate | High |
| <1 CME | Customer needs to save a baseline level of 1 CME in liquid assets before considering other financial goals. | | |
| <3 CME | Customer should save 3 CME. | Customer should allocate funds to either Emergency Fund, Debt Paydown, or both. | |
| <6 CME | Customer should save 6 CME. | Customer should pay down debt with recurring payments. They are also eligible to save for Emergency Fund. | Customer should pay down debt with lump and/or recurring payments. They are also eligible to save for Emergency Fund. |
| >6 CME | Customer is ready to Invest. | Customer should pay down debt with recurring payments | Customer should pay down debt with lump and/or recurring payments |

A "none" level of high interest debt load is defined as a customer with no revolving debt. A "moderate" level of high interest debt load is defined as a customer with revolving debt that takes less than 3 months to pay down with recurring payments of approximately 5-10% of a customer's discretionary income on top of their minimum payment for that revolving debt. And, a "high" level of interest debt load is defined as a customer with revolving debt that takes greater than 3 months to pay down with recurring payments of approximately 5-10% of a customer's discretionary income on top of their minimum payment for that revolving debt. The method then ends.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a data integration engine comprising:
one or more first processors; and
first memory storing first instructions that, when executed by the one or more first processors, cause the data integration engine to:
determine user data associated with an estimated monthly expenses of a user, an estimated monthly income of the user, an estimated emergency fund level of the user, and an estimated high interest debt level of the user, wherein at least a portion of the user data is in a non-compliant format; and
convert the portion of the user data in the non-compliant format into a compliant format;
a decision tree engine comprising:
one or more second processors; and
second memory storing second instructions that, when executed by the one or more second processors, cause the decision tree engine to:
receive, from the data integration engine, the user data having the converted portion;
determine, based on the user data having the converted portion, a financial action for the user, wherein determining the financial action comprises determining results for each branch of a decision tree that associates the financial action with combinations of values of the estimated monthly expenses, the estimated monthly income, the estimated emergency fund level, and the estimated high interest debt level; and
cause, via a guidance user interface, an output of the financial action.

2. The system of claim 1, wherein:
the estimated monthly expenses are associated with total monthly fixed expenses incurred by the user to cover essential needs;
the estimated monthly income comprises a gross, a net, and a discretionary income;
the estimated emergency fund level is based on an amount of liquid assets available to cover the estimated monthly expenses; or
the estimated high interest debt level is associated with a loan with an interest rate above a pre-set threshold.

3. The system of claim 1, wherein the first instructions, when executed by the one or more first processors, cause the data integration engine to determine the user data by causing the data integration engine to:
receive, via the guidance user interface, first input data associated with the user, wherein the first input data associated with the user comprises data corresponding to at least one of the user's monthly expenses, monthly income, emergency fund level, or high interest debt level;
receive, from one or more external data servers, second input data associated with the user, wherein the second input data associated with the user comprises data corresponding to at least one of the user's monthly expenses, monthly income, emergency fund level, or high interest debt level; and
generate, based on the first input data and the second input data, the user data.

4. The system of claim 3, wherein the first instructions, when executed by the one or more first processors, further cause the data integration engine to:
based on the first input data and the second input data, generate second user data comprising:
a variability score for each of the estimated monthly expenses of the user, the estimated monthly income of the user, the estimated emergency fund level of the user, and the estimated high interest debt level of the user, wherein the variability score is based on a ratio of an interquartile range (IQR) or standard deviation to a value, and wherein the value is the estimated monthly expenses, the estimated monthly income, the emergency fund level or the high interest debt level; and a reasonableness score for each of the estimated monthly expenses of the user, the estimated monthly income of the user, the estimated emergency fund level of the user, and the estimated high interest debt level of the user.

5. The system of claim 4, wherein the second instructions, when executed by the one or more second processors, cause the decision tree engine to determine the financial action for the user by causing the decision tree engine to:
receive second user data; and
determine the financial action for the user further based on the second user data.

6. The system of claim 1, wherein the first instructions, when executed by the one or more first processors, cause the data integration engine to convert the portion of the user data in the non-compliant format into the compliant format by further causing the data integration engine to:
validate the converted portion by generating a plurality of test cases to test compliance of the converted portion and applying the plurality of test cases to the converted portion.

7. The system of claim 6, wherein the first instructions cause the data integration engine to generate the plurality of test cases by causing the data integration engine to generate test data configured to test a range of edge result cases associated with the converted portion.

8. The system of claim 1, wherein the first instructions, when executed by the one or more first processors, further cause the data integration engine to determine the user data based on one or more of the following:
user augmented data;
merchant category code;
credit bureau data;
geographic benchmark estimates;
a cost of living estimate; or
a housing cost estimate.

9. The system of claim 1, wherein the user data comprises one or more of the following:
an emergency fund savings goal based on a monetary value of one, three, or six months of committed monthly expenses;
an emergency fund shortfall based on an amount the user needs to save to reach the emergency fund savings goal;
an emergency fund save rate based on as a percentage of a discretionary income the user allocates to the estimated emergency fund level of the user; or
an emergency fund timescale based on a number of months to achieve the emergency fund savings goal.

10. The system of claim 1, wherein the first instructions, when executed by the one or more second processors, cause the decision tree engine to determine the financial action for the user by causing the decision tree engine to:
generate a twelve-cell matrix based on:
an estimated high interest debt load of (1) none, (2) moderate, and (3) high, and
an estimated emergency fund level of (1) less than one month of the estimated monthly expenses, (2) less than three months of the estimated monthly expenses, (3) less than six months of the estimated monthly expenses, and (4) greater than six months of the estimated monthly expenses.

11. A method comprising:
determining, by a data integration engine, user data associated with an estimated monthly expenses of a user, an estimated monthly income of the user, an estimated emergency fund level of the user, and an estimated high interest debt level of the user, wherein at least a portion of the user data is in a non-compliant format;
converting, by the data integration engine, the portion of the user data in the non-compliant format into a compliant format;
validating, by the data integration engine, the converted portion of the user data by generating a plurality of test cases to test compliance of the converted portion of the user data and applying the plurality of test cases to the converted portion of the user data;
sending, by the data integration engine and to a decision tree engine, the user data having the converted portion;
determining, by the decision tree engine and based on the user data having the converted portion, a financial action for the user, wherein determining the financial action comprises determining results for each branch of a decision tree that associates the financial action with combinations of values of the estimated monthly expenses, the estimated monthly income, the estimated emergency fund level, and the estimated high interest debt level; and
causing, by the decision tree engine and via a guidance user interface, an output of the financial action.

12. The method of claim 11, wherein the user data comprises one or more of the following:
an emergency fund savings goal based on a monetary value of one, three, or six months of committed monthly expenses;
an emergency fund shortfall based on an amount the user needs to save to reach the emergency fund savings goal;
an emergency fund save rate based on as a percentage of a discretionary income the user allocates to the estimated emergency fund level of the user; or
an emergency fund timescale based on a number of months to achieve the emergency fund savings goal.

13. The method of claim 11, wherein determining the user data comprises:
receiving, via the guidance user interface, first input data associated with a user, wherein the first input data associated with the user comprises data corresponding to at least one of the user's monthly expenses, monthly income, emergency fund level, or high interest debt level;
receiving, from one or more external data servers, second input data associated with the user, wherein the second input data associated with the user comprises data corresponding to at least one of the user's monthly expenses, monthly income, emergency fund level, or high interest debt level; and
generating, based on the first input data and the second input data, the user data.

14. The method of claim 13, wherein determining the financial action further comprises:
based on the first input data and the second input data, generating, by the data integration engine, second user data comprising:
a variability score for each of the estimated monthly expenses of the user, the estimated monthly income of the user, the estimated emergency fund level of the user, and the estimated high interest debt level of the user, wherein the variability score is based on a ratio of an interquartile range (IQR) or standard deviation to a value, and wherein the value is the estimated monthly expenses, the estimated monthly income, the emergency fund level or the high interest debt level; and a reasonableness score for each of the estimated monthly expenses of the user, the estimated monthly income of the user, the estimated emergency fund level of the user, and the estimated high interest debt level of the user;

receiving, by the decision tree engine and from the data integration engine, the second user data; and determining, by the decision tree engine, the financial action for the user further based on the second user data.

15. The method of claim 11, determining the financial action for the user comprises:

generating a twelve-cell matrix based on:
an estimated high interest debt load of (1) none, (2) moderate, and (3) high, and
an estimated emergency fund level of (1) less than one month of the estimated monthly expenses, (2) less than three months of the estimated monthly expenses, (3) less than six months of the estimated monthly expenses, and (4) greater than six months of the estimated monthly expenses.

16. A non-transitory computer-readable medium comprising instructions that, when executed by one or more processors, cause a computing device to perform steps comprising:

determining, by a data integration engine, user data associated with an estimated monthly expenses of a user, an estimated monthly income of the user, an estimated emergency fund level of the user, and an estimated high interest debt level of the user, wherein at least a portion of the user data is in a non-compliant format;

converting, by the data integration engine, the portion of the user data in the non-compliant format into a compliant format;

validating, by the data integration engine, the converted portion of the user data by generating a plurality of test cases to test compliance of the converted portion of the user data and applying the plurality of test cases to the converted portion of the user data;

sending, by the data integration engine and to a decision tree engine, the user data having the converted portion;

determining, by the decision tree engine and based on the user data having the converted portion, a financial action for the user, wherein determining the financial action comprises determining results for each branch of a decision tree that associates the financial action with combinations of values of the estimated monthly expenses, the estimated monthly income, the estimated emergency fund level, and the estimated high interest debt level; and causing, by the decision tree engine and via a guidance user interface, an output of the financial action.

17. The non-transitory computer-readable medium of claim 16, wherein the user data comprises one or more of the following:

an emergency fund savings goal based on a monetary value of one, three, or six months of committed monthly expenses;

an emergency fund shortfall based on an amount the user needs to save to reach the emergency fund savings goal;

an emergency fund save rate based on as a percentage of a discretionary income the user allocates to the estimated emergency fund level of the user; or an emergency fund timescale based on a number of months to achieve the emergency fund savings goal.

18. The non-transitory computer-readable medium of claim 16, wherein the instructions cause the computing device to determine the user data by:

receiving, via the guidance user interface, first input data associated with a user, wherein the first input data associated with the user comprises data corresponding to at least one of the user's monthly expenses, monthly income, emergency fund level, or high interest debt level;

receiving, from one or more external data servers, second input data associated with the user, wherein the second input data associated with the user comprises data corresponding to at least one of the user's monthly expenses, monthly income, emergency fund level, or high interest debt level; and generating, based on the first input data and the second input data, the user data.

19. The non-transitory computer-readable medium of claim 18, wherein the instructions further cause the computing device to determine the financial action by:

based on the first input data and the second input data, generating, by the data integration engine, second user data comprising:
a variability score for each of the estimated monthly expenses of the user, the estimated monthly income of the user, the estimated emergency fund level of the user, and the estimated high interest debt level of the user, wherein the variability score is based on a ratio of an interquartile range (IQR) or standard deviation to a value, and wherein the value is the estimated monthly expenses, the estimated monthly income, the emergency fund level or the high interest debt level; and
a reasonableness score for each of the estimated monthly expenses of the user, the estimated monthly income of the user, the estimated emergency fund level of the user, and the estimated high interest debt level of the user;

receiving, by the decision tree engine and from the data integration engine, the second user data; and determining, by the decision tree engine, the financial action for the user further based on the second user data.

20. The non-transitory computer-readable medium of claim 16, wherein the instructions cause the computing device to determine the financial action by:

generating a twelve-cell matrix based on:
an estimated high interest debt load of (1) none, (2) moderate, and (3) high, and an estimated emergency fund level of (1) less than one month of the estimated monthly expenses, (2) less than three months of the estimated monthly expenses, (3) less than six months of the estimated monthly expenses, and (4) greater than six months of the estimated monthly expenses.

* * * * *